K. KINDSCHERF.
DETACHABLE WHEEL RIM.
APPLICATION FILED NOV. 10, 1910.
1,012,367.
Patented Dec. 19, 1911.
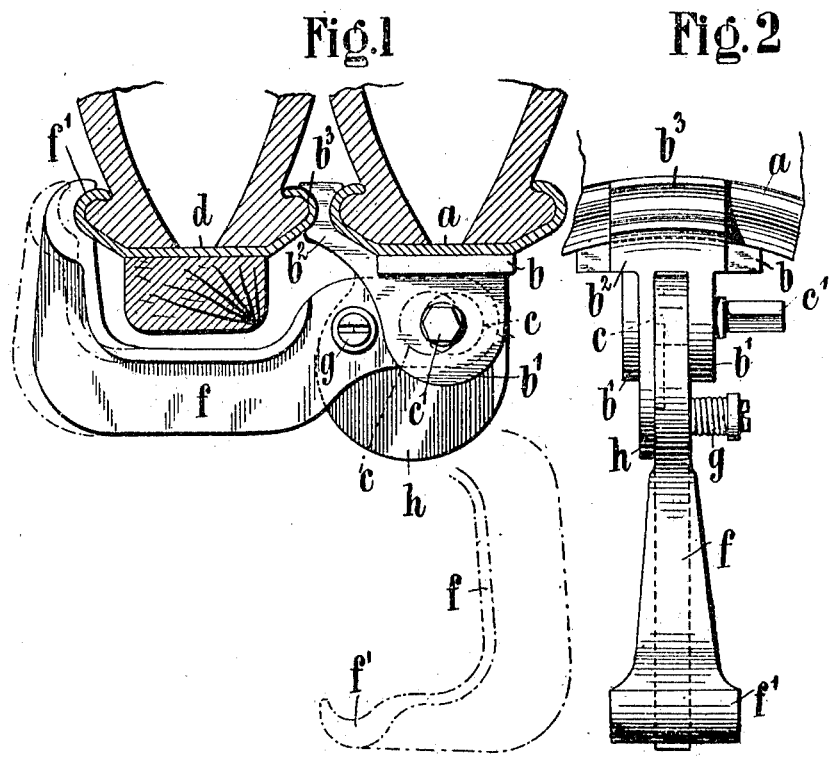
INVENTOR
KARL KINDSCHERF,
BY Hanson and Hanson,
his Attorneys.
WITNESSES

UNITED STATES PATENT OFFICE.

KARL KINDSCHERF, OF HANOVER, GERMANY, ASSIGNOR TO CONTINENTAL-CAOUTCHOUC- & GUTTA-PERCHA-COMPAGNIE, OF HANOVER, GERMANY.

DETACHABLE WHEEL-RIM.

1,012,367.  Specification of Letters Patent.  Patented Dec. 19, 1911.

Application filed November 10, 1910. Serial No. 591,625.

*To all whom it may concern:*

Be it known that I, KARL KINDSCHERF, a subject of the Grand Duke of Baden, and residing at Hanover, Germany, have invented a certain new and useful Improvement in Detachable Wheel-Rims, of which the following is a specification.

My invention relates to detachable rims for automobiles and like vehicles and especially to a securing device therefor, the special object of my invention being to so improve the same that the device may be readily operated by a single person in applying the rim to a wheel.

In the accompanying drawings, Figure 1 is a transverse section showing the method of applying the device; and Fig. 2 is an elevation of the securing device at right angles to Fig. 1 and showing the detachable rim device in readiness for adjustment. Fig. 3 is a section through portion of the claw arm showing the friction device.

The securing device to which this invention relates comprises a claw $f$ pivoted between lugs $b^1$, $b^1$, formed on the base $b$ mounted rigidly on the detachable rim $a$. The arm $b^2$, also formed on the base, is grooved on both sides of its outer end $b^3$ to fit the rounded side of an ordinary clencher rim so that when the detachable rim is adjusted to position, the side of the stationary rim $d$ on the wheel felly fits into one of these grooves as shown in Fig. 1. After the claw $f$ has been swung up beneath the felly and with its grooved tip $f^1$ engages the opposite or inner side of the stationary rim, the claw as a whole is retracted by an eccentric $c$ operated by a wrench through its squared end $c^1$.

In the features described the claw is of known form. In its old form however, it is extremely difficult for a single person to adjust the rim by reason of the fact that the claw $f$ must be held open in the position shown in dotted lines, Fig. 1, until the parts are properly juxtaposed and the claw swung into clamping position. If the claw is permitted to swing freely on its pivot, as it does in the old form, one person cannot maintain the several claws, which are arranged around the rim, in proper position for the adjustment. To obviate this disadvantage, I now propose to provide a simple friction device sufficient to hold the claw in any position to which it may be adjusted. In the form shown my improvement takes the form of a spring pressed friction member $x$ carried by the shank of the claw and pressing against the side of the disk-like flange $h$ which may conveniently be cast with the base $b$. Whatever position is given the claw $f$, the friction member $x$ remains in frictional contact with the side of the flange $h$, and holds the claw in its given position. The tension of the friction spring $g^1$ may be regulated by the screw $g$ threaded into the hub $k$ and locked by the nut $l$.

Obviously this friction device may be variously modified without departing from my invention, and I do not limit myself to the details shown, but claim:

1. In a detachable wheel rim, an engaging claw pivoted to the detachable rim, a flange rigid with said rim and a friction device carried by said claw and bearing against said flange to hold said claw in the position to which it may be adjusted on its pivot.

2. A securing device for detachable wheel rims, comprising an engaging claw, a base therefor adapted to be rigidly secured to the wheel rim, lugs on said base between which said claw is pivotally mounted, a flange rigid with said base and projecting beyond said lugs together with a spring-pressed friction pin carried by said claw and bearing constantly against said flange to hold said claw in the position to which it may be adjusted, substantially as described.

In testimony whereof I have signed my name to this specification, in the presence of two subscribing witnesses.

KARL KINDSCHERF.

Witnesses:
 OTTO FILAU,
 H. M. CHALMERS.